(12) United States Patent
Kumar et al.

(10) Patent No.: US 6,769,008 B1
(45) Date of Patent: Jul. 27, 2004

(54) METHOD AND APPARATUS FOR DYNAMICALLY ALTERING CONFIGURATIONS OF CLUSTERED COMPUTER SYSTEMS

(75) Inventors: Krishna Kumar, Cupertino, CA (US); Declan J. Murphy, San Francisco, CA (US); Andrew L. Hisgen, Cupertino, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/480,466

(22) Filed: Jan. 10, 2000

(51) Int. Cl.[7] .............................................. G06F 15/16
(52) U.S. Cl. ...................... 709/201; 709/220; 709/221; 709/222; 709/226
(58) Field of Search ................................ 709/201, 220, 709/221, 222, 226

(56) References Cited

U.S. PATENT DOCUMENTS

| | | |
|---|---|---|
| 5,283,783 A | 2/1994 | Nguyen et al. |
| 5,459,857 A | 10/1995 | Ludlam et al. |
| 5,687,308 A | 11/1997 | Jardine et al. |
| 5,774,660 A | 6/1998 | Brendel et al. |
| 5,790,772 A | 8/1998 | Badovinatz et al. |
| 5,822,531 A | 10/1998 | Gorczyca et al. ...... 395/200.51 |
| 5,890,014 A | 3/1999 | Long |
| 5,909,540 A | 6/1999 | Carter et al. |
| 5,918,017 A | 6/1999 | Attanasio et al. |
| 5,964,838 A | 10/1999 | Cheung et al. |
| 5,964,886 A | 10/1999 | Slaughter et al. |
| 5,991,518 A | 11/1999 | Jardine et al. |
| 5,996,001 A | 11/1999 | Quarles et al. |
| 5,999,712 A * | 12/1999 | Moiin et al. ................ 709/220 |
| 6,002,851 A | 12/1999 | Basavaiah et al. |
| 6,003,075 A | 12/1999 | Arendt et al. |
| 6,097,882 A | 8/2000 | Mogul |

(List continued on next page.)

FOREIGN PATENT DOCUMENTS

| | | |
|---|---|---|
| EP | 0817444 A2 | 1/1998 |
| EP | 0865180 A2 | 9/1998 |
| WO | 98/26559 | 6/1998 |
| WO | 98/33227 | 7/1999 |

OTHER PUBLICATIONS

Hunt et al., "Network Dispatcher: a connection router for scalable Internet services", Computer Networks and ISDN Systems 30(1998) 347–357.

(List continued on next page.)

Primary Examiner—Saleh Najjar
(74) Attorney, Agent, or Firm—Beyer Weaver & Thomas, LLP (57) ABSTRACT

Improved techniques for dynamically altering configurations of clustered computing systems are disclosed. The improved techniques can be implemented to allow alteration of an existing configuration of a clustered computing system without having to completely shutdown the clustered computing system. As a result, the clustered computing system can provide uninterrupted services while the configuration of the clustered computing system is being dynamically altered, yet also safeguard against unwanted partitions in time or space.

28 Claims, 7 Drawing Sheets

U.S. PATENT DOCUMENTS

| | | | | |
|---|---|---|---|---|
| 6,108,699 A | * | 8/2000 | Moiin | 709/221 |
| 6,185,619 B1 | | 2/2001 | Joffe et al. | |
| 6,192,401 B1 | * | 2/2001 | Modiri et al. | 709/220 |
| 6,192,483 B1 | | 2/2001 | Moiin et al. | |
| 6,195,680 B1 | | 2/2001 | Goldszmidt et al. | |
| 6,219,786 B1 | | 4/2001 | Cunningham et al. | |
| 6,226,684 B1 | | 5/2001 | Sung et al. | |
| 6,243,744 B1 | * | 6/2001 | Snaman et al. | 709/220 |
| 6,247,141 B1 | | 6/2001 | Holmberg | |
| 6,256,675 B1 | | 7/2001 | Rabinovich | |
| 6,304,980 B1 | | 10/2001 | Beardsley et al. | |
| 6,363,077 B1 | | 3/2002 | Wong et al. | |
| 6,363,495 B1 | | 3/2002 | MacKenzie et al. | |
| 6,401,120 B1 | * | 6/2002 | Gamache et al. | 709/226 |
| 6,424,992 B2 | | 7/2002 | Devarakonda et al. | |
| 6,427,163 B1 | * | 7/2002 | Arendt et al. | 709/201 |
| 6,438,652 B1 | | 8/2002 | Jordan et al. | |
| 6,438,705 B1 | | 8/2002 | Chao et al. | |
| 6,445,709 B1 | | 9/2002 | Chiang | |
| 6,449,641 B1 | * | 9/2002 | Moiin et al. | 709/220 |
| 6,453,426 B1 | | 9/2002 | Gamache et al. | |
| 6,470,389 B1 | | 10/2002 | Chung et al. | |
| 6,526,432 B1 | * | 2/2003 | Briskey et al. | 709/201 |
| 6,532,494 B1 | * | 3/2003 | Frank et al. | 709/224 |
| 6,615,256 B1 | * | 9/2003 | van Ingen et al. | 709/220 |
| 6,662,219 B1 | * | 12/2003 | Nishanov et al. | 709/220 |

OTHER PUBLICATIONS

Goldszmidt, "Load Management for Scaling up Internet Services", IEEE, 1998 pp. 828–835.

VanHalderen et al., "Hierarchical resource management in the Polder metacomputing Initiative", (11/98) Parallel Computing, NL/Elsevier Science Publ., Amsterdam. vol. 24, No. 12–13, pp. 1807–25.

Chang et al., "An ordered and reliable broadcast protocol for distributed systems", (7/97) Computer Comm., NL/Elsevier Science Publ., Amsterdam, vol. 20, No. 6, pp. 487–99.

European Search Report, (Jun. 22, 2001).

Lamport, "A New Solution of Dijkstra's Concurrent Programming Problem," Aug. 1974, Communications of the ACM, vol. 17, No. 8, pp 453–455.

Preslan et al., "Device Locks: Mutual Exclusion for Storage Area Networks," Mar. 15, 1999, IEEE.

Soltis et al., "The Design and Performance of a Shared Disk File System for IRIX," Mar. 23, 1998, Sixth NASA Goddard Space Center Conference on Mass Storage and Technologies.

Scheible, "Information Technology, Serial Storage Architecture–SCSI–3 Protocol (SSA–S3P)," Rev. 5b, Apr. 1997.

* cited by examiner

METHOD AND APPARATUS FOR DYNAMICALLY ALTERING CONFIGURATIONS OF CLUSTERED COMPUTER SYSTEMS

CROSS-REFERENCE TO RELATED APPLICATIONS

This application is related to the following applications, filed concurrently herewith and incorporated herein by reference: (1) U.S. patent application Ser. No. 09/480,785, entitled "METHOD AND APPARATUS FOR MANAGING OPERATIONS OF CLUSTERED COMPUTER SYSTEMS"; (2) U.S. patent application Ser. No. 09/479,485, entitled "CONTROLLED TAKE OVER OF SERVICES BY REMAINING NODES OF CLUSTERED COMPUTING SYSTEM"; (3) U.S. patent application Ser. No. 09/479,468, entitled "METHOD AND APPARATUS FOR RESOLVING PARTIAL CONNECTIVITY IN A CLUSTERED COMPUTING SYSTEM"; (4) U.S. patent application Ser. No. 09/480,330, entitled "METHOD TO DYNAMICALLY CHANGE CLUSTER OR DISTRIBUTED SYSTEM CONFIGURATION"; and (5) U.S. patent application Ser. No. 09/480,329, entitled "EMULATION OF PRESISTANT GROUP RESERVATIONS".

BACKGROUND OF THE INVENTION

1. Field of the Invention

The present invention relates to computer systems and, more particularly, to improved methods and apparatus for dynamically altering configuration of clustered computer systems.

2. Description of the Related Art

Figure 1:
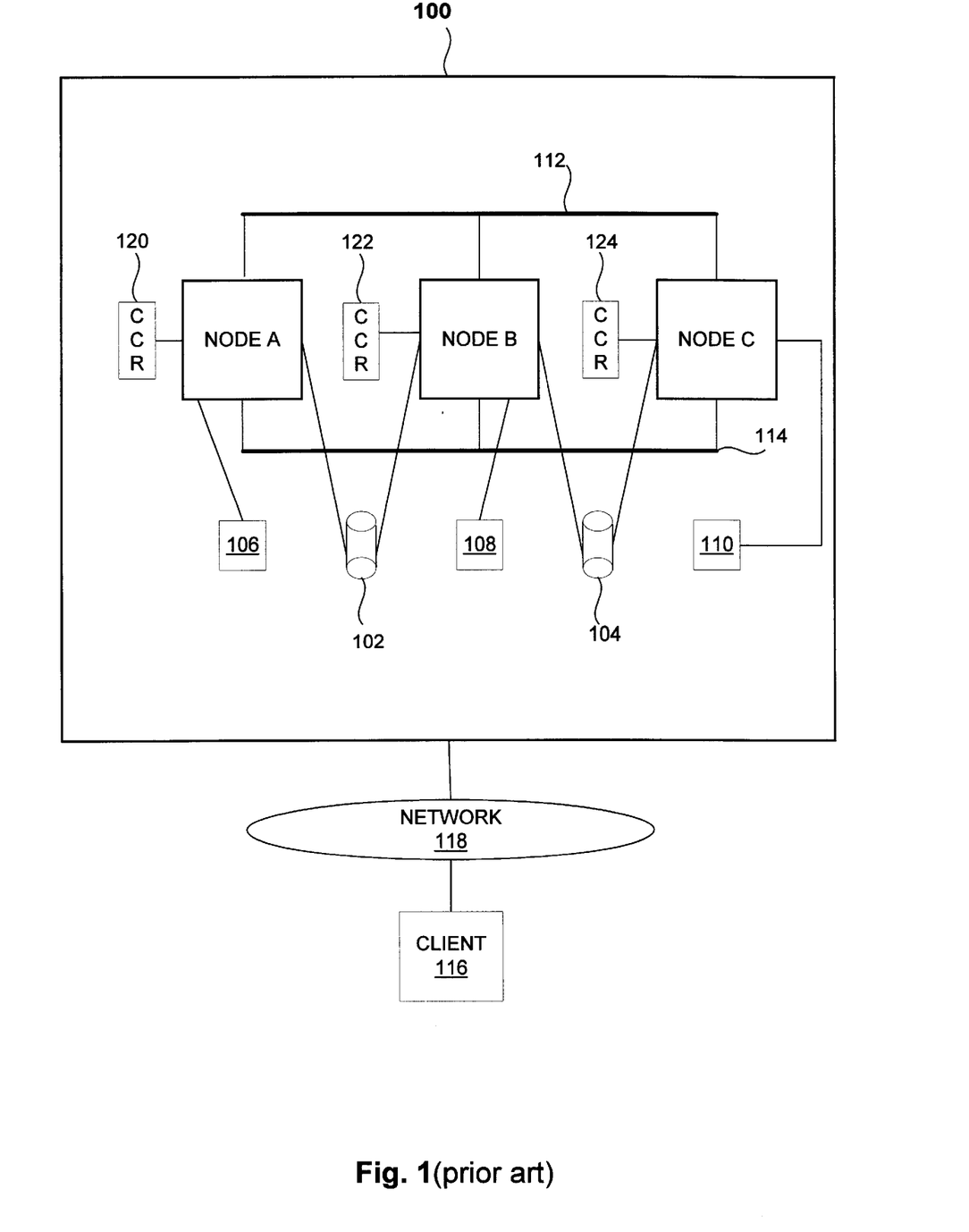
FIG. 1 illustrates a clustered computing system.

In contrast to single mainframe computing models of the past, more distributed computing models have recently evolved. One such distributed computing model is known as a clustered computing system. FIG. 1 illustrates an exemplary clustered computing system 100 including computing nodes (nodes) A, B and C, storage devices (e.g., storage disks 102–104), and other computing devices 106–110 representing other devices such as scanners, printers, digital cameras, etc. For example, each of the nodes A, B and C can be a computer with its own processor and memory. The collection of nodes A, B and C, storage disks 102–104, and other devices 106–110 make up the clustered computing system 100.

Typically, the nodes in a cluster are coupled together through a "private" interconnect with redundant pathways. As shown in FIG. 1, nodes A, B and C are coupled together through private communication channels 112 and 114. For example, the private communication channels 112 and 114 can adhere to Ethernet, ATM, or Scalable Coherent (SCI) standards. A client 116 can communicate with the clustered computing system 100 via a network 118 (e.g., public network) using a variety of protocols such as Transmission Control Protocol (TCP), User Datagram Protocol (UDP), etc. From the point of view of the client 116, the clustered computing system 100 is a single entity that can provide the client 116 with a variety of computer-implemented services, e.g., web-hosting, transaction processing, etc. In other words, the client 116 is not aware of which particular node(s) of the clustered computing system 100 is (are) providing service to it.

The clustered computing system 100 provides a scalable and cost-efficient model where off-the-shelf computers can be used as nodes. The nodes in the clustered computing system 100 cooperate with each other to provide a distributed computing model that is transparent to users, e.g., the client 116. In addition, in comparison with single mainframe computing models, the clustered computing system 100 provides improved fault tolerance. For example, in case of a node failure within the clustered computing system 100, other nodes can take over to perform the services normally performed by the node that has failed.

Typically, nodes in the clustered computing system 100 send each other "responsive" (often referred to as "heart beat" or activation) signals over the private communication channels 112 and 114. The responsive signals indicate whether nodes are active and responsive to other nodes in the clustered computing system 100. Accordingly, these responsive signals are periodically sent by each of the nodes so that if a node does not receive the responsive signal from another node within a certain amount a time, a node failure can be suspected. For example, in the clustered computing system 100, if nodes A and B do not receive a signal from node C within an allotted time, nodes A and B can suspect that node C has failed. In this case, if nodes A and B are still responsive to each other, a two-node sub-cluster (AB) results. From the perspective of the sub-cluster (AB), node C can be referred to as a "non-responsive" node. If node C has really failed then it would be desirable for the two-node sub-cluster (AB) to take over services from node C. However, if node C has not really failed, taking over the services performed by node C could have dire consequences. For example, if node C is performing write operations to the disk 104 and node B takes over the same write operations while node C is still operational, data corruption can result.

It should be noted that the fact that nodes A and B have not received responsive signals from node C does not necessarily mean that node C is not operational with respect to the services that are provided by node C. Other events can account for why responsive signals for node C have not been received by nodes A and B. For example, the private communication channels 112 and 114 may have failed. It is also possible that node C's program for sending responsive signals may have failed but node C is fully operational with respect to the services that it provides. Thus, it is possible for the clustered computing system 100 to get divided into two or more functional sub-clusters wherein the sub-clusters are not responsive to each other. This situation can be referred to as a "partition in space" or "split brain" where the cluster no longer behaves as a single cohesive entity. In this and other situations, when the clustered computing system no longer behaves as a single cohesive entity, it can be said that the "integrity" of the system has been compromised.

In addition to partitions in space, there are other potential problems that need to be addressed in managing the operation of clustered computing systems. For example, another potential problem associated with operating clustered computing systems is referred to as a "partition in time" or "amnesia." As is known to those skilled in the art, partitions in time can occur when a clustered computing system is operated with cluster configurations that vary over time.

One problem is that the conventional methods do not provide for techniques that allow alteration of configuration of the clustered computing systems dynamically. For example, adding a new node to a clustered computing system typically requires shutting down all the existing nodes in the clustered computing system in order to guard against undesired partitions in time or space. Similarly, removing a node typically requires shutdown of all other existing nodes in the clustered computing system.

In view of the foregoing, there is a need for techniques that enable dynamic configuration changes to clustered computing systems.

SUMMARY OF THE INVENTION

Broadly speaking, the invention relates to improved techniques for dynamically altering configurations of clustered computing systems. In one aspect, the improved techniques allow alteration of an existing configuration of a clustered computing system without having to completely shutdown the clustered computing system. Accordingly, components such as nodes or other devices (e.g., peripheral devices) can be added to, or removed from, the clustered computing system while one or more existing nodes remain active. As a result, the clustered computing system can provide uninterrupted services while the configuration of the clustered computing system is being dynamically altered, yet also safeguard against unwanted partitions in time or space.

The invention can be implemented in numerous ways, including a system, an apparatus, a method or a computer readable medium. Several embodiments of the invention are discussed below.

As a method for altering configuration of a clustered computing system, one embodiment of the invention includes the acts of: identifying a first component that is to be added to or removed from the clustered computing system, and updating component vote information associated with at least one active component of the clustered computing system while the at least one active component remains active.

As a method for altering configuration of a clustered computing system having at least one active component with associated configuration vote information, another embodiment of the invention includes the acts of: receiving a configuration alteration request for addition or removal of one or more components to or from the existing configuration of the clustered computing system; selecting one of the components associated with the configuration alteration request as a selected component; obtaining a vote for the selected component; updating the configuration vote information of the active component in accordance with the vote while the at least one active component remains active; determining whether the updating of the configuration vote was successful; and determining whether there are other components associated with the configuration alteration request to be selected. When other components are to be selected, the method can operate to add or remove the other components.

As a clustered computing system, an embodiment of the invention includes a computing cluster including at least one computing node, and a configuration manager provided for the at least one computing node to update component vote information associated with at least one active component of the clustered computing system while the at least one active component remains active.

As a computer readable media including computer program code for altering configuration of a clustered computing system having at least one active component with associated configuration vote information, an embodiment of the invention includes: computer program code for receiving a configuration alteration request, the configuration alteration request requesting addition or removal of one or more components to or from the existing configuration of the clustered computing system; computer program code for selecting one of the components associated with the configuration alteration request as a selected component; computer program code for obtaining a vote for the selected component; computer program code for updating the configuration vote information of the active component while the at least one active component remains active; computer program code for determining whether the computer program code for updating the configuration vote information has successfully updated the configuration vote information; and computer program code for determining whether there is another component associated with the configuration alteration request to be selected.

As computer readable media including computer program code for altering configuration of a clustered computing system including at least one component, an embodiment of the invention includes: computer program code for identifying a first component that is to be added to or removed from the clustered computing system; and computer program code for updating component vote information associated with at least one active component of the clustered computing system while the at least one active component remains active.

The invention has numerous advantages. One advantage is that the invention provides for dynamic alteration of configurations of clustered computing systems. Another advantage is that dynamic alterations can be achieved without causing unwanted partitions in time or space. Still another advantage is that the techniques of the invention can be implemented without having to substantially interrupt the operations and services provided by the clustered computing systems.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for dynamically altering configurations of clustered computing systems. The improved techniques allow alteration of an existing configuration of a clustered computing system without having to completely shutdown the clustered computing system. Accordingly, components, such as nodes or other devices (e.g., peripheral devices), can be added to or removed from the clustered computing system while one or more existing nodes remain active. As a result, the clustered computing system can provide uninterrupted services while the configuration of the clustered computing system is being dynamically altered, yet also safeguard against unwanted partitions in time or space.

Figure 2A:
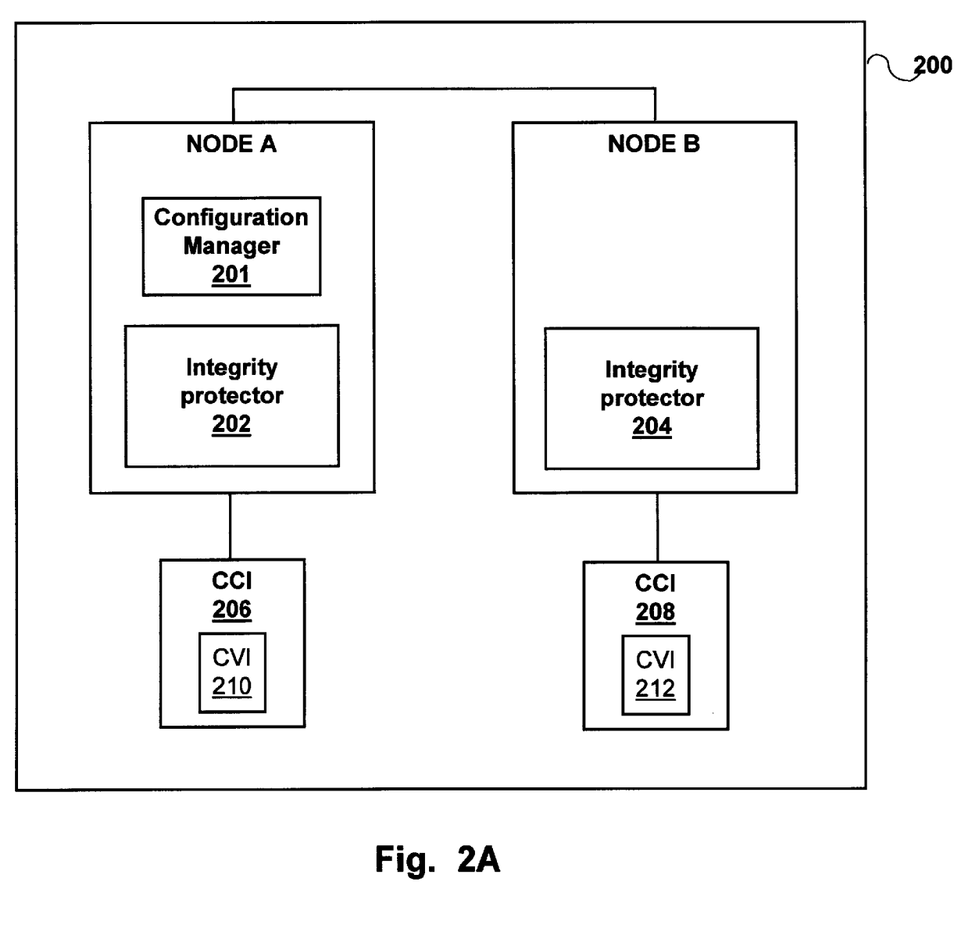
FIG. 2A illustrates an exemplary enhanced clustered computing system in accordance with one embodiment of the invention.

FIG. 2A illustrates an exemplary enhanced clustered computing system 200 in accordance with one embodiment of the invention. The enhanced clustered computing system 200 includes two computing nodes, node A and node B. However, it should be recognized that other computing components (components) such as one or more additional nodes and/or devices, such as storage devices, printers, scanners, cameras, etc., can be added to the enhanced clustered computing system 200. The nodes of a clustered computing system form a computing cluster and behave as a cohesive logical unit. Accordingly, the enhanced computing cluster 200 is represented as a single entity to clients (e.g., client 116 of FIG. 1) requesting services from the enhanced clustered computing system 200.

As shown in FIG. 2A, the enhanced clustered computing system 200 includes a configuration manager 201 supported by node A. The configuration manager 201 can reside on one or more of the nodes of the enhanced clustered computing system 200. As will be discussed in greater detail below, the configuration manager 201 allows configuration of the enhanced clustered computing system 200 to be dynamically altered without having to shut down all the active nodes in the enhanced clustered computing system 200.

Each of the nodes A and B of the clustered computing system 200 respectively includes an integrity protector 202 and 204. Among other things, the integrity protectors 202 and 204 ensure that potential problems associated with operation of clustered computing systems do not arise when configurations of the enhanced clustered computing system 200 are altered dynamically. The integrity protectors 202 and 204 typically also prevent undesired partitions in time and space during normal operation and start-up of the enhanced clustered computing system 200. Moreover, the configuration manager 201 and the integrity protectors 202 and 204 together permit the dynamic alteration to the configuration while preventing any failures during the altering of the configuration from causing unwanted partitions in time and space. In other words, the dynamic alteration to the configuration is achieved such that failures during the altering of the configuration are tolerated so that partitions in time and space are prevented.

Each of the nodes A and B also stores Cluster Configuration Information (CCI) for the enhanced clustered computing system 200. Each node stores its own version of the CCI which should, in general, be identical. Namely, node A stores CCI 206 and node B stores CCI 208 in memory storage (e.g., persistent storage such as disk storage) available to the nodes. The CCI is information that represents the configuration of the enhanced clustered computing system 200. For example, the CCI can describe nodes, devices and interconnections of the enhanced clustered computing system 200. In addition, the CCI also includes Component Vote Information (CVI) that details information, such as a list of nodes, votes for the nodes, proxy devices, votes for the proxy devices, and connections for the proxy devices. In other words, the CVI is typically stored as a part of the CCI and is particularly used in vote related determinations such as by the integrity protectors 202 and 204. Each node stores its own version of the CVI which should, in general, also be identical. Namely, node A stores CVI 210 and node B stores CVI 212 as a part of the CCI 206 and the CCI 208, respectively.

A dynamic alteration of the configuration of the enhanced clustered computing system 200 comes about when a node or device is to be added to or removed from the existing configuration of the enhanced clustered computing system 200. The alteration (or modification) to the configuration of the enhanced clustered computing system 200 is referred to as dynamic because it is performed while the enhanced clustered computing system 200 is active, namely, while one or more nodes are active (i.e., operational). Accordingly, the configuration of the enhanced clustered computing system 200 can be dynamically altered without significantly interfering with ongoing operations or services provided by the enhanced clustered computing system 200.

The alteration of the configuration of the enhanced clustered computing system 200 requires that the CCI 206 and 208 be updated to reflect the new configuration. The invention provides an approach to update the CCI 206 and 208 while one or both of the nodes A and B are active, yet still safeguards against formation of unwanted partitions in time or space. The configuration manager 201 serves to manage the updating of the CCI 206 and 208 in a safe and reliable manner so that the updates can occur without having to shutdown the enhanced clustered computing system 200 (i.e., shutting down both of the nodes, A and B). In accordance with the invention, the update of the CVI 210 and 212 portion of the CCI 206 and 208 is of primary concern when there is an alteration to the configuration. However, other portions of the CCI can also be modified (e.g., to reflect the physical changes of the new configuration). Hence, our discussion below focuses on the update to the CVI.

In one embodiment, the configuration manager 201 updates the CVI 210 and 212 by modifying the information related to votes that have been assigned to one or more nodes and/or one or more devices of the enhanced clustered computing system 200. As both nodes and devices can be referred to as components, this information related to votes is also referred to herein as component votes. In other words, components are often assigns one or more votes (component vote(s)) that are used in preventing partitions in time and space from forming within the enhanced clustered computing system 200. For example, if one vote is assigned to each of the nodes A and B, the total number of votes available in the enhanced clustered computing system 200 would be two. Because each node A and B has its own CCI 206 and 208, each node has information about its own vote as well as votes of other components (i.e., nodes or devices) in the enhanced clustered computing system 200.

In one embodiment, a new component (e.g., a new node N) that is to be added to the existing configuration of the enhanced clustered computing system 200 is assigned a vote of one (1). To add the new node to the existing configuration of the enhanced clustered computing system 200, the configuration manager 201 updates the CCI 206 and 208 as well as the CVI 210 and 212. The CCI 206 and 208 is updated to indicate that the new node N is physically present. The CVI 210 and 212 is updated to add the new node N to the list of nodes and to store its vote. The updating of the CVI 210 and 212 is typically done serially for each node, although the invention is not so limited. It should be noted that upon the successful completion of the update operations performed by the configuration manager 201, the total number of votes available in the enhanced clustered computing system 200 has increased by one (e.g., from 2 to 3 votes).

The update operation described above can be repeated by the configuration manager 201 for each node if more than one node is to be added to the enhanced clustered computing system 200. In this way, the total number of votes available in the enhanced clustered computing system 200 (total votes available) is incrementally increased by one vote for each new node that is added to the enhanced clustered computing system 200.

In the case of a node removal, the configuration manager 201 updates the CVI of the remaining node(s) to remove the votes that is (are) assigned to the node that is to be removed from the configuration of the enhanced clustered computing system 200 (i.e., the node that is to be removed conceptually is assigned zero votes). It should be noted that if the node that is to be removed has more than one vote, in one embodiment, the configuration manager 201 can decrease the vote assigned to it in stages. For example, the configuration manager 201 can decrease the votes in decrements of one. In other words, update operations performed by the configuration manager 201 can be implemented in various stages, where at each stage a set of update operations are performed to decrease the votes assigned to the node being removed in decrements of one until reaching zero. However, it should be noted that the invention is not limited to altering the votes by decrements of one.

Before update operations are initiated for another component, a determination is made as to whether the previous update operation was successfully completed for the prior component. In other words, a determination is made as to whether the CVI for all the existing (or remaining) nodes have been successfully updated (to reflect an increment (or decrement) of one vote for the component vote that is associated with the component that is to be added to (or removed from) the system). As a result, if it is determined that the previous update operation did not complete successfully, then the configuration alteration fails and operational methods are performed to guard against partitions in time and space.

As will be appreciated by those skilled in the art, when a clustered computing system is being dynamically reconfigured, partitions in time and space can potentially occur if update of a node of the clustered computing system fails during the alteration. For example, when each of the existing nodes A and B is assigned one vote, altering the total votes available by values greater than one can result in undesired effects, such as partitions in time and space. In other words, by incrementally changing the CVI at a limited rate (e.g., increment or decrement by one or another suitable predetermined number), the update operations of the invention can prevent unwanted partitions in time or space. Moreover, if an incremental change is not successful, then an error condition results and operational methods are performed to guard against partitions in time and space. In one embodiment, the integrity protectors 202 and 204 perform the operational methods.

As noted earlier, in addition to nodes, clustered computing systems may also include devices, such as storage devices (e.g., storage disks), printers, scanners, cameras, etc. In accordance with one aspect of the invention, devices can dynamically be added or removed from clustered computing systems. In one embodiment, one or more devices are assigned "proxy" votes that can be controlled by at least one of the nodes of the clustered computing system. The devices that can be assigned proxy votes are also referred to herein as "proxy devices".

Figure 2B:
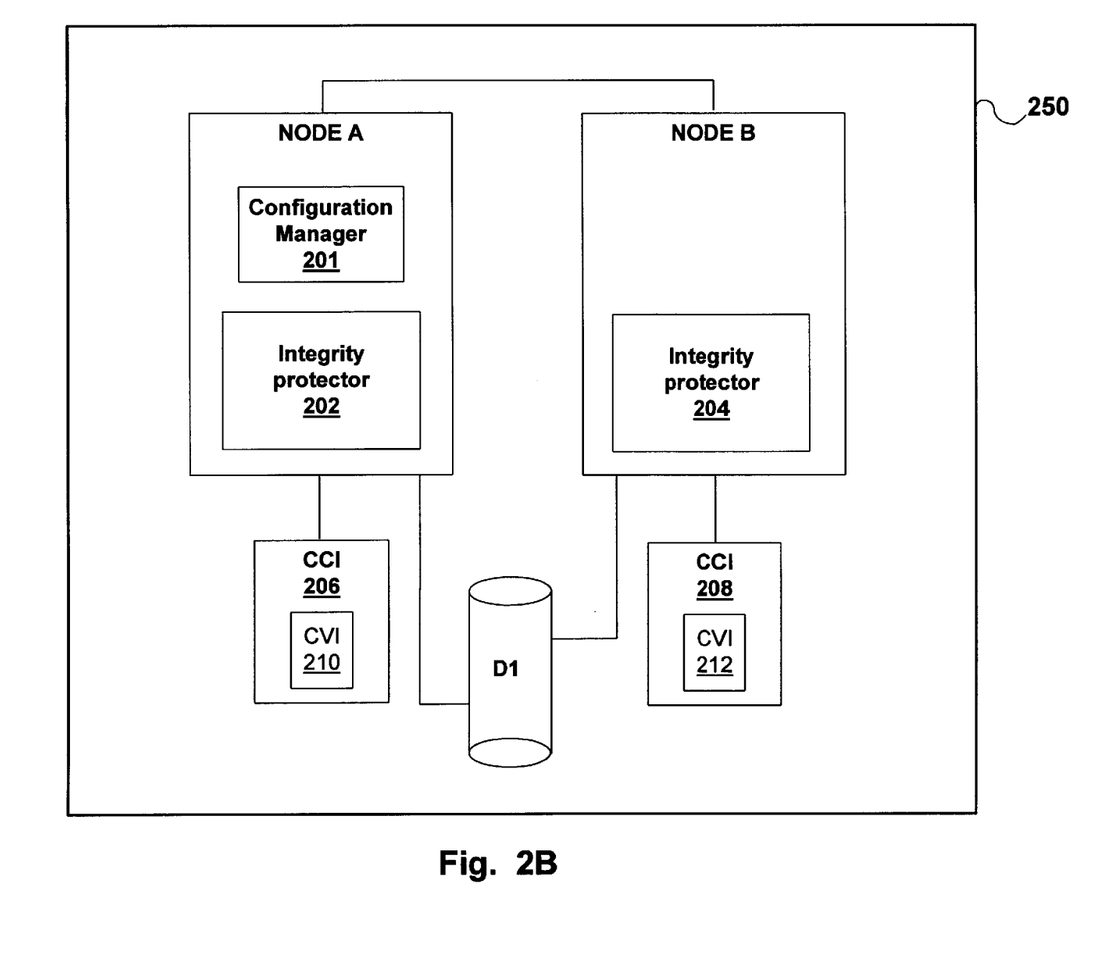
FIG. 2B illustrates an exemplary enhanced clustered computing system in accordance with another embodiment of the invention.

FIG. 2B illustrates an exemplary enhanced clustered computing system 250 in accordance with another embodiment of the invention. The enhanced cluster computing system 250 is generally the same as the enhanced clustered computing system 200 of FIG. 2A but further includes one or more other devices, such as a storage device D1. The storage device D1 can be shared by nodes A and B such that it can be accessed by both nodes A and B. The storage device D1 is a proxy device. In one embodiment, the storage device D1 can be assigned (N−1) proxy votes, wherein N is the number of nodes configured to access the storage device D1. For example, in the case of the enhanced clustered computing system 250 of FIG. 2B, the storage device D1 would be assigned one proxy vote, since two nodes (A and B) are configured to access the storage device D1. However, more generally, a proxy device can be assigned votes in various other ways.

A proxy device can be added to, or removed from, the clustered computing system 250 in a like manner as discussed with respect to computing nodes. It should be noted that in order to add or remove a proxy device, the CVI 210 and 212 are updated by the configuration manager 201. In addition, the CCI 206 and 208 are updated to reflect the physical alteration to the configuration. It should also be noted that if the proxy device that is to be added (or removed) has a proxy vote that is greater than one, the configuration manager 201 can update the CVI 210 and 212 in stages where at each stage the CVI 210 and 212 is modified by one or another suitable predetermined number. An updating operation for addition of a proxy device to a configuration of an enhanced clustered computing system is discussed in detail below with respect to FIG. 5.

Figure 3A:
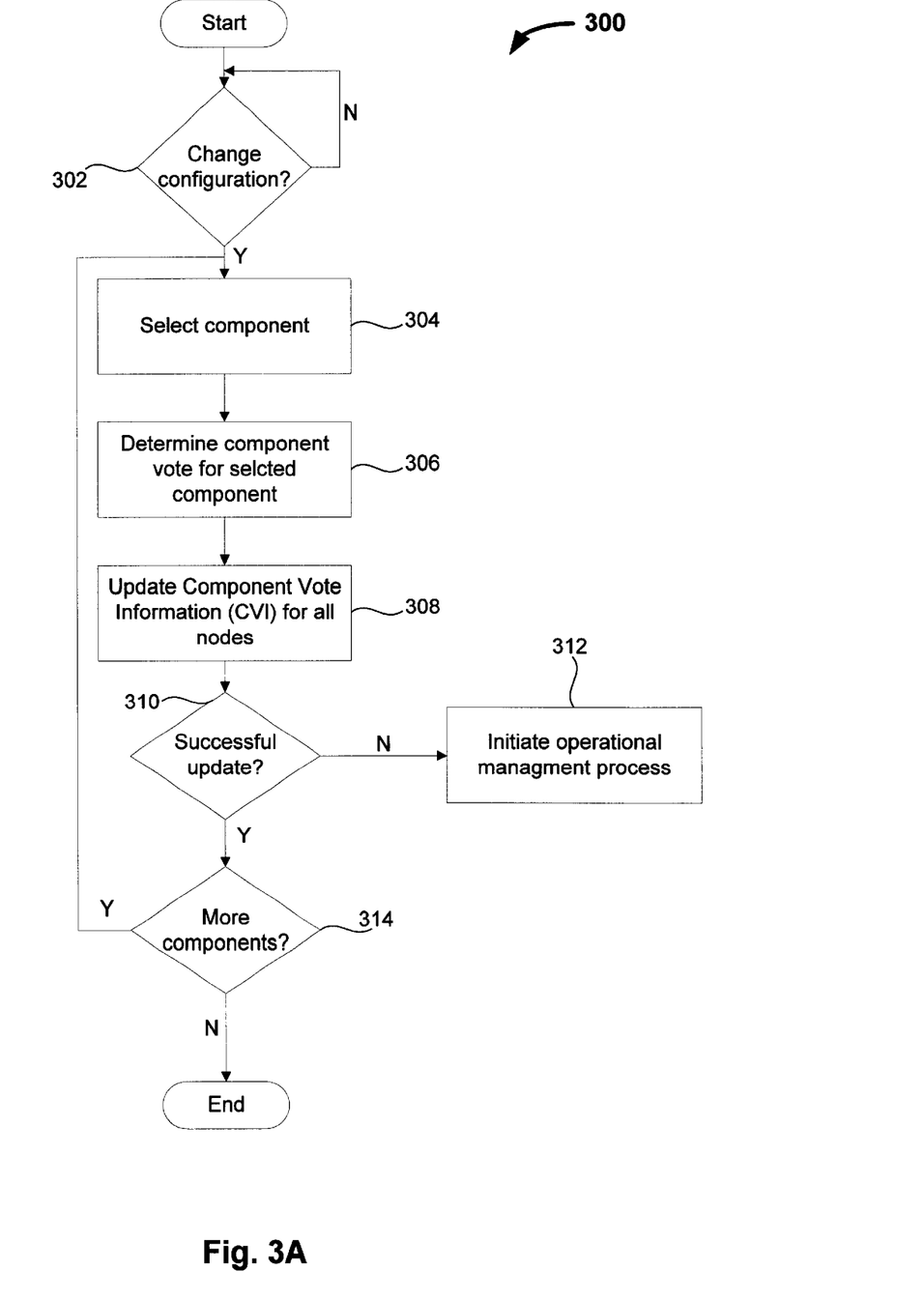
FIG. 3A illustrates a dynamic alteration method for altering configurations of a clustered computing system in accordance with one embodiment of the invention.

FIG. 3A illustrates a dynamic alteration method 300 for altering configurations of a clustered computing system in accordance with one embodiment of the invention. The dynamic alteration method 300 allows alteration of the configuration of the clustered computing system while one or more components (nodes and/or devices) are active. For example, the dynamic alteration method 300 can be performed by the configuration manager 201 of enhanced clustered computing systems 200 and 250 of FIGS. 2A and 2B, respectively. Initially, at operation 302 a determination is made as to whether a request to alter an existing configuration is received. This request can be a request or command to add and/or remove one or more components from the existing configuration of the clustered computing system. Once a request to alter the existing configuration has been received, a component that is to be added to or removed from the clustered computing system is selected at operation 304. Here, a single component is selected. Next, at operation 306, a component vote for the selected component is determined. This component vote represents the votes assigned to the selected component. Based on the component vote obtained, Component Vote Information (CVI) for all nodes is updated at operation 308.

Next, at operation 310 a determination is made as to whether the update operation performed at operation 308 was successfully completed. If the update was not successful, an operational management method can be initiated at operation 312 to ensure that the clustered computing system does not become partitioned in time or space. As will be discussed below with respect to FIG. 3B, the operational management ensures that at most one sub-cluster remains active. In one embodiment, the request to alter the configuration is cancelled when the update operation performed at operation 308 does not successfully complete.

On the other hand, if the determination at operation 310 determines that the update operation has been completed successfully, a determination is made at operation 314 as to whether any more components need to be added or removed from the clustered computing system. If there are one or more components to be added to or removed from the clustered computing system, the dynamic alteration method 300 proceeds back to operation 304 where the next component is selected and then processed in a similar manner. When operation 314 determines that there are no more components to be added to or removed from the clustered computing system, the dynamic alteration method 300 ends.

Accordingly, the dynamic alteration method 300 is configured to add components to the clustered computing system one component at a time. The dynamic alteration method 300 also monitors the success or failure of the updating of the CVI for the one component being added and invokes the operational management when an update fails, so as to prevent any partitions in time or space from forming during the dynamic configuration of the clustered computing system.

Figure 3B:
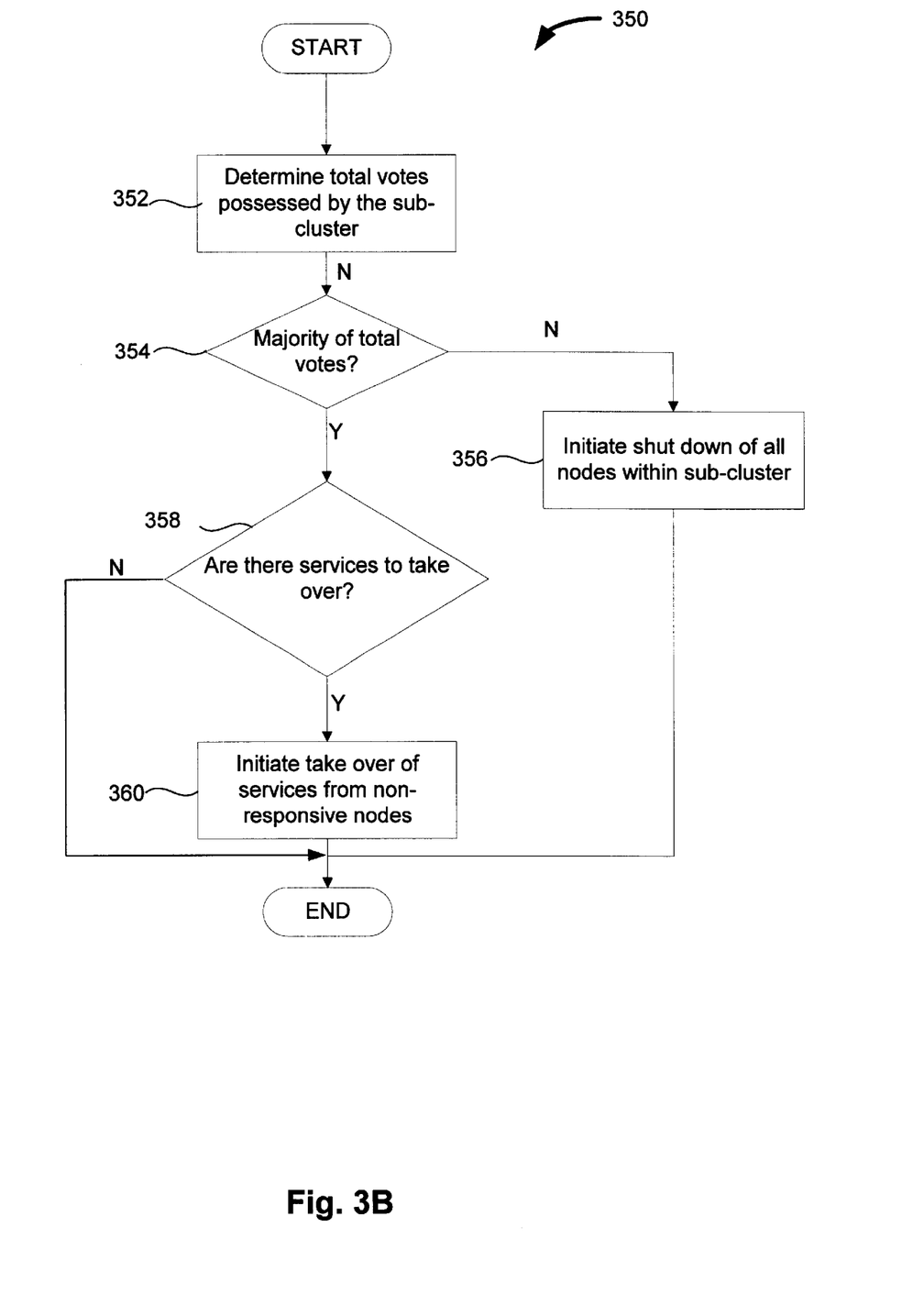
FIG. 3B illustrates an operational management method for managing operations of a clustered computing system according to one embodiment of the invention.

FIG. 3B illustrates an operational management method 350 for managing operations of a clustered computing system according to one embodiment. Namely, the operational management method 350 guards against undesired partitions in space that can occur when the clustered computing system fragments into sub-clusters. In particular, the operational management method 350 represents processing performed during the operation 312 of FIG. 3A. For example, the operational management method 350 can be implemented as a series of operations that are performed by the enhanced clustered computing system 200 and 250 discussed above with respect to FIGS. 2A and 2B. In one implementation, the operational management method 350 is performed by the integrity protectors 202–204 of the enhanced clustered computing system 200 and 250. The operational management method 350 can be performed on each of the active nodes of the clustered computing system.

Initially, at operation 352, the total number of votes possessed by a sub-cluster (sub-cluster votes) is determined. The sub-cluster includes one or more computing nodes that are responsive to each other. Next, in operation 354 a determination is made as to whether the total votes possessed by the sub-cluster is a majority of total number of votes available in the clustered computing system. The total number of votes available can be a number that is determined based on the computing nodes and/or devices that are configured in the clustered computing system. For example, the total number of votes can be determined by each node based on the Configuration Vote Information (CVI) that is provided to each node. If the number of votes possessed by the sub-cluster does not constitute a majority, shutdown of all nodes within the sub-cluster is initiated as noted in operation 356. On the other hand, if the number of votes possessed by the sub-cluster represents a majority of the total number of votes available, the operational management method 350 proceeds to operation 358 where a decision is made to determine whether any of the services need to be taken over from the non-responsive nodes.

According to the operational management method 350, at most one sub-cluster can possess a majority of total votes in the clustered computing system, even if one component is in the process of being added or removed. If any of the services provided by non-responsive nodes need to be taken over (as determined by operation 358), take over of services from the non-responsive nodes can be initiated by the sub-cluster having the majority of total votes in the clustered computing system at operation 360. Otherwise, if there are no services to be taken over, the operational management method 350 bypasses operation 360. Following operations 356 and 360, as well as operation 358 when no services are to be taken over, the operational management method 350 ends.

Additional details on operational management method are provided in U.S. patent application Ser. No. 09/480,785, entitled "METHOD AND APPARATUS FOR MANAGING OPERATIONS OF CLUSTERED COMPUTER SYSTEMS", which has been incorporated by reference above.

Figure 4:
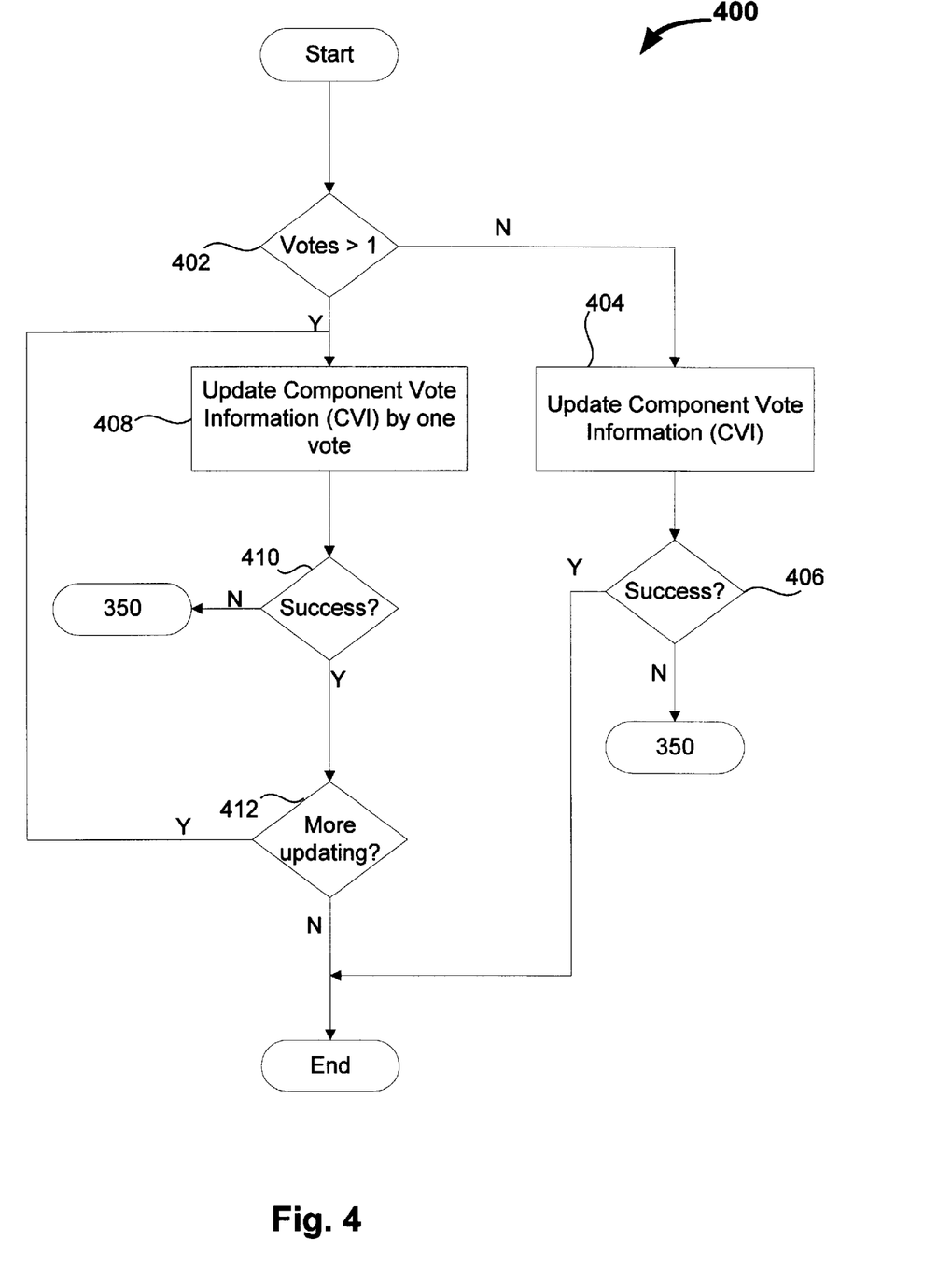
FIG. 4 illustrates an updating method for updating component vote information (CVI) for components of a clustered computing system in accordance with one embodiment of the invention.

FIG. 4 illustrates an updating method 400 for updating component vote information (CVI) for components of a clustered computing system in accordance with one embodiment of the invention. For example, the updating method 400 can represent updating operations that are performed at operations 308 and 310 of FIG. 3A.

Initially, at operation 402 a determination is made as to whether the component vote for a component that is to be added to or removed from the clustered computing system is greater than one (1). While it is possible that other numbers besides one (1) could be used, this embodiment uses one because it provides a general solution that is safe and effective. If the component vote is less than or equal to one (1), the updating method 400 proceeds to an operation 404 where the CVI is updated for each node to reflect the component vote of the component being added to or removed from the clustered computing system. Typically, the CVI is updated node-by-node, such that the CVI for a first node is updated, then the CVI for a second node is updated, etc. Next, at operation 406 a determination is made as to whether the CVI for all the nodes in the clustered computing system have been successfully updated to reflect the component vote of the component that is being added to or removed from the clustered computing system. If the update has not been successful, the operational management 350 of FIG. 3B is initiated to protect against other possible operation errors like split brain or amnesia. Alternatively, if the update was completed successfully, the updating method 400 ends.

On the other hand, if at operation 402 the determination is made that the component vote for the component that is to be added to (or removed from) the clustered computing system is greater than one (1), the updating method 400 proceeds to operation 408 where the CVI for the component is updated for all the nodes of the clustered computing system. Here, the CVI for the component being added (or removed) is updated in increments (or decrements) of one. In other words, the updating of the CVI is achieved in stages. Such updating is done for the CVI associated with each of the nodes, in a node-by-node manner.

Next, at operation 410 a determination is made as to whether the update operations were successful. If the update operations were not successfully completed, the updating method 400 can proceed to the operational management method 350 of FIG. 3B to protect against other possible operational errors like split brain or amnesia. However, if the update operations were successfully completed, the updating method 400 can proceed to operation 412 where a determination is made as to whether more updating operations are needed. This determination is made to ascertain whether the CVI has been fully updated to accurately reflect the component votes for the component that is being added (or removed from) the clustered computing system. If it is determined at operation 412 that another update (i.e., another stage) is needed, the updating method 400 proceeds again to operation 408 where the CVI for the component is updated for all the nodes of the clustered computing system.

Here, the CVI for the component is incremented (or decremented) by one (1). Accordingly, operations 408–412 repeat until the operation 412 determines that no more updating is needed. At this point, the CVI for the component at each node contains the full component vote for the component even though it was achieved through an incremental process. After the operation 412 determines that no more updating is needed, the updating method 400 ends.

Figure 5:
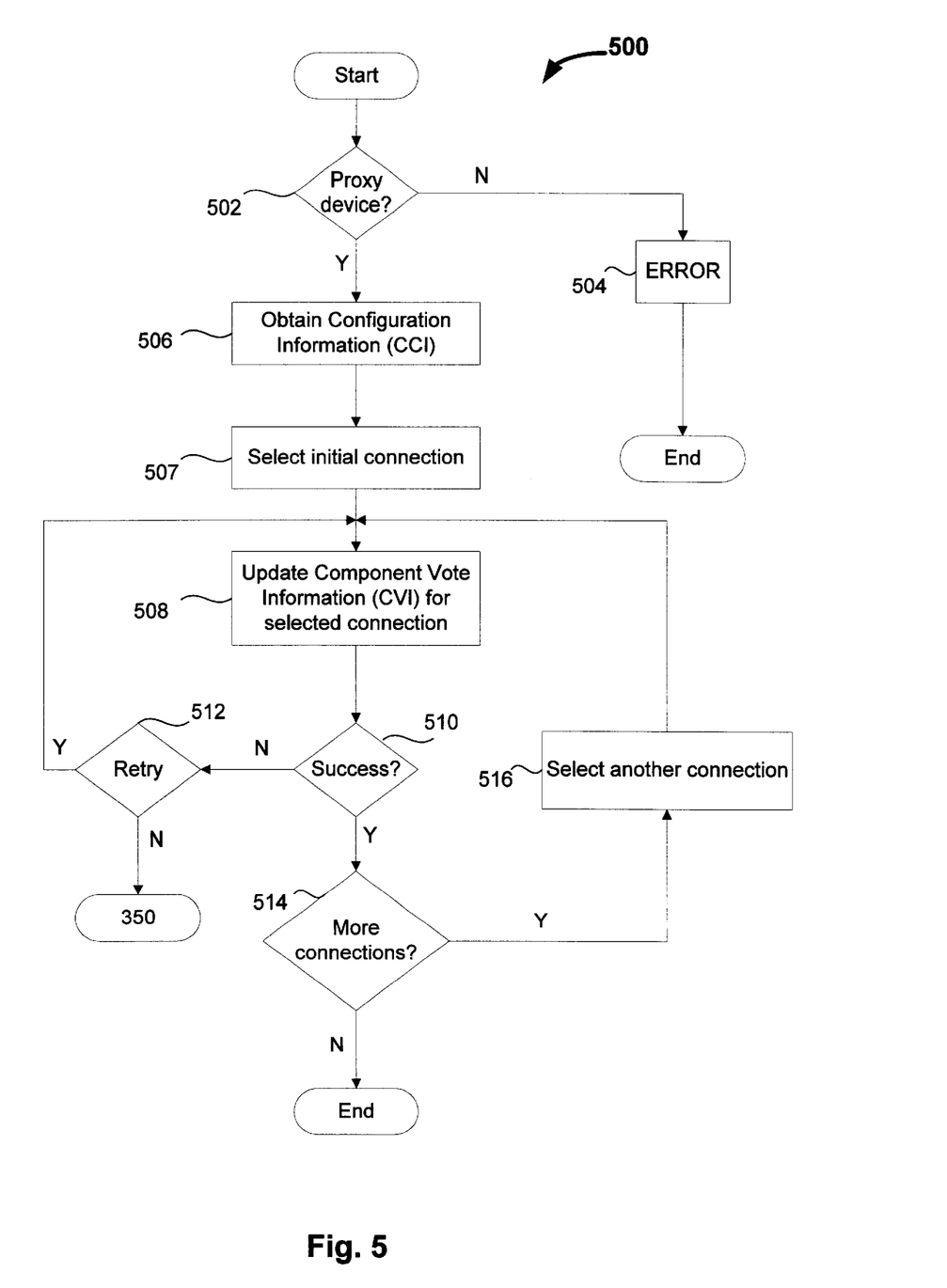
FIG. 5 illustrates an updating method for updating component vote information (CVI) for components of a clustered computing system in accordance with another embodiment of the invention.

FIG. 5 illustrates an updating method 500 for updating component vote information (CVI) for components of a clustered computing system in accordance with another embodiment of the invention. More particularly, the updating method 500 updates the CVI for components of a clustered computing system when a new proxy device is to be added to the system. For example, the updating method 500 can represent update operations that are performed at operations 308 and 310 of FIG. 3A when the component being added is a proxy device. An embodiment of the update method for removal of a proxy device would be similar.

Initially, at operation 502 a determination is made as to whether the component that is to be added to the clustered computing system is a proxy device. A proxy device has a proxy vote associated therewith. If the component is not a proxy device with an appropriate proxy vote assigned to it, an error message can be generated at operation 504 and the updating method 500 ends because devices that are not proxy devices should not be processed in this manner. On the other hand, if the operation 502 determines that the component is a proxy device, the updating method 500 can proceed to operation 506 where cluster configuration information (CCI) for the proxy device can be obtained. Typically, the CCI is already available when the updating method 500 begins. In one embodiment, the CCI includes, among other things, information on the nodes to which the proxy device is to be connected (i.e., connections). In one embodiment, the proxy device can be assigned (N−1) votes where N is the number of nodes that can access the proxy device (i.e., number of connections). Hence, from knowing the number of connections for the proxy device, the proxy vote for the proxy device can be determined.

Next, at operation 507 an initial one of the connections for the proxy device is selected. Then, the CVI for the component is updated on each of the nodes of the clustered computing system for the selected connection at operation 508. With the proxy votes being assigned based on N−1 connections, with the initial connection, the proxy vote is initially zero. If not done previously, the CCI for each of the nodes with respect to the initial connection can be similarly updated to reflect the proxy vote.

Next, at operation 510 a determination is made as to whether the update at operation 508 was successfully completed. If the update was not successfully completed, a determination is made as to whether a retry of the update operation should be attempted at operation 512. If a retry is to be attempted, the retry is initiated and the updating method 500 proceeds to repeat the operation 508. However, if a retry is not to occur, then a problem condition is present so the updating method 500 does not complete and an operational management method (e.g., the operational management 350) is initiated to protect against other possible operational errors like split brain or amnesia.

On the other hand, if it is determined at operation 510 that the update has been successful, the update method 500 proceeds to operation 514 where a determination is made as to whether more connections (nodes) for the proxy device need to be processed. If there are more connections to be processed, another one of the connections for the proxy device is selected.

When the operation 514 determines that there are no more connections to be processed, the updating method 500 ends. At this point the CVI for the proxy device on all the nodes indicates not only those nodes connected to the proxy device but also the proxy vote for the proxy device. The updating method 500 operates in stages to process one connection at a time, thereby ensuring that the total votes available are changed incrementally even as multiple vote proxy devices are added to the clustered computing system.

The invention has numerous advantages. One advantage is that the invention provides for dynamic alteration of configurations of clustered computing systems. Another advantage is that dynamic alterations can be achieved without causing unwanted partitions in time or space. Still another advantage is that the techniques of the invention can be implemented without having to substantially interrupt the operations and services provided by the clustered computing systems.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for altering a configuration of a clustered computing system, the clustered computing system including at least one component, said method comprising:

storing component vote information for at least one active component of the clustered computing system, wherein the component vote information includes votes assigned to components that are configured in the clustered computing system;

receiving a configuration alteration request, the configuration alteration request requesting addition or removal of one or more components to or from the existing configuration of the clustered computing system;

selecting one of the components associated with the configuration alteration request as a selected component;

obtaining a vote for the selected component; and updating the component vote information stored for the at least one active component of the clustered computing system while the at least one active component remains active to reflect the vote for the selected component.

2. A method as recited in claim 1, wherein said updating operates to incrementally or decrementally update the component vote information with respect to an update value, and wherein said updating is performed in stages that each represent a portion of said update value.

3. A method as recited in claim 2, wherein said updating is done in increments or decrements of one.

4. A method as recited in claim 1, wherein said updating operates to prevent partitions in time or space in the clustered computing system.

5. A method as recited in claim 1, wherein the component vote information is stored separately for each of a plurality of components of the clustered computing system, and wherein the at least one active component is one of the plurality of components, and wherein said updating operates to serially update the component vote information stored for each of the plurality of components of the clustered computing system while the at least one active component remains active.

6. A method as recited in claim 1, wherein said method further comprises:
   determining whether said updating has been successful; and
   initiating an operational management process when said updating has not been successful.

7. A method as recited in claim 6,
   wherein the operational management process is a method for managing operation of the clustered computing system including at least a cluster of computing nodes, and
   wherein the operational management process comprises:
      determining whether one of the computing nodes in the cluster has become a non-responsive node in a non-responsive sub-cluster;
      determining a sub-cluster vote for a sub-cluster of one or more nodes, the sub-cluster representing a portion of the cluster that remains responsive;
      obtaining a total vote for the clustered computing system;
      determining whether the sub-cluster vote is at least a majority of the total vote; and
      initiating shutdown of the one or more computing nodes within the sub-cluster when said determining determines that the sub-cluster vote is not at least a majority of the total vote.

8. A method as recited in claim 1, wherein said method further comprises:
   determining a predetermined threshold vote; and
   wherein said updating of the component vote information is performed by a series of one or more operations, each one of the one or more operations adding or subtracting the predetermined threshold vote to or from the component vote information stored for the at least one active component.

9. A method as recited in claim 8, wherein said method further comprises;
   (a) determining whether one of the series of one or more operations was successful; and
   (b) initiating another one of the series of one or more operations only when said determining(a) determines that one of the series of one or more operations was successful.

10. A method as recited in claim 8, wherein the predetermined threshold vote is one vote.

11. A method as recited in claim 8, wherein the selected component is a computing node or a proxy device.

12. A method as recited in claim 8,
   wherein the configuration alteration request indicates that a first component and a second component are to be added to or removed from the clustered computing system,
   wherein said updating operates to first update the component vote information for the first component and then secondly updates the component vote information for the second component.

13. A method as recited in claim 9,
   wherein the selected component that is to be added to or removed from the clustered computing system is a proxy device, and a plurality of the components of the clustered computing system are computing nodes, and wherein the proxy device is assigned (N−1) votes, where N is the number of computing nodes that are connected to the proxy device.

14. A method as recited in claim 13, wherein each of the computing nodes that are connected to the proxy device is assigned one vote.

15. A method for altering a configuration of a clustered computing system including at least one component, the configuration of the clustered computing system having at least one active component, the active component having associated configuration vote information stored therein, said method comprising:
   (a) receiving a configuration alteration request, the configuration alteration request requesting addition or removal of one or more components to or from the existing configuration of the clustered computing system;
   (b) selecting one of the components associated with the configuration alteration request as a selected component;
   (c) obtaining a vote for the selected component;
   (d) updating the configuration vote information of the active component in accordance with the vote while the at least one active component remains active;
   (e) determining whether said updating (d) was successful;
   (f) determining whether there is another component associated with the configuration alteration request to be selected; and
   (g) repeating said selecting (b) through said determining (e) for the another component when said determining (f) determines that there is another component to be selected.

16. A method as recited in claim 15, wherein said updating (d) operates to incrementally or decrementally update the component vote information in increments or decrements of one.

17. A method as recited in claim 16,
   wherein the component vote information is stored separately for each of a plurality of the components of the clustered computing system, the at least one active component being one of the plurality of the components, and
   wherein said updating (d) operates to serially update the component vote information associated with each of the plurality of components of the clustered computing system while the at least one active component remains active.

18. A method as recited in claim 15, wherein said method further comprises:
   initiating an operational management process when said updating (d) has not been successful.

19. A clustered computing system, comprising:
   a computing cluster including at least one computing node; and
   a configuration manager provided for the at least one computing node, the configuration manager updating component vote information associated with at least one active component of the clustered computing system while the at least one active component remains active;
   wherein the component vote information includes votes assigned to components that are configured in the clustered computing system, and
   wherein the component vote information is stored for the at least one active component.

20. A clustered computing system as recited in claim 19,
wherein the configuration manager incrementally updates the component vote information when the configuration alteration request requests to add a component to the clustered computing system, and wherein the configuration manager decrementally updates the component vote information when the configuration alteration request requests to remove a component from the clustered computing system.

21. A clustered computing system as recited in claim 20 wherein the configuration manager updates the component vote information in increments or decrements of one.

22. A clustered computing system as recited in claim 19; wherein the clustered computing system further comprises:

an integrity protector provided on each one of the computing nodes, the integrity protector determining a vote count for a set of computing nodes in the cluster, the set of nodes representing at least a portion of the cluster, and the integrity protector determining whether the set of computing nodes should be shutdown based on the vote count.

23. A computer readable medium including computer program code for altering a configuration of a clustered computing system including at least one component, the configuration of the clustered computing system having at least one active component, the active component having associated configuration vote information stored therein, the computer readable medium comprising:

(a) computer program code for receiving a configuration alteration request, the configuration alteration request requesting addition or removal of one or more components to or from the existing configuration of the clustered computing system;

(b) computer program code for selecting one of the components associated with the configuration alteration request as a selected component;

(c) computer program code for obtaining a vote for the selected component;

(d) computer program code for updating the configuration vote information of the active component while the at least one active component remains active;

(e) computer program code for determining whether the computer program code (d) has successfully updated the configuration vote information; and (f) computer program code for determining whether there is another component associated with the configuration alteration request to be selected.

24. A computer readable medium as recited in claim 23, wherein the computer readable medium further comprises:

(g) computer program code for repeating the computer program code (b) through the computer program code (e) when the computer program code (f) determines that there is another component to be selected.

25. A computer readable medium as recited in claim 23, wherein the computer program code (d) operates to incrementally or decrementally update the component vote information in increments or decrements of one, respectively.

26. A computer readable medium as recited in claim 23,
wherein the component vote information is stored separately for each of a plurality of the components of the clustered computing system, the at least one active component being one of the plurality of the components, and wherein the computer program code (d) operates to serially update the component vote information associated with each of the plurality of components of the clustered computing system while the at least one active component remains active.

27. A computer readable medium as recited in claim 23, wherein the computer readable medium further comprises:

computer program code for initiating an operational management process when the computer program code (d) has not successfully updated the configuration vote information.

28. A computer readable medium including computer program code for altering configuration of a clustered computing system including at least one component, said computer readable medium comprising:

"computer program code for storing component vote information for at least one active component of the clustered computing system, wherein the component vote information includes votes assigned to components that are configured in the clustered computing system;

computer program code for receiving a configuration alteration request, the configuration alteration request requesting addition or removal of one or more components to or from the existing configuration of the clustered computing system;

computer program code for selecting one of the components associated with the configuration alteration request as a selected component, obtaining a vote for the selected component, and computer program code for updating the component vote information stored for the at least one active component of the clustered computing system while the at least one active component remains active to reflect the vote for the selected component."

* * * * *